(12) United States Patent
Yamashita

(10) Patent No.: US 7,740,037 B2
(45) Date of Patent: Jun. 22, 2010

(54) RUNFLAT TIRE

(75) Inventor: Fumikazu Yamashita, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 605 days.

(21) Appl. No.: 11/637,150

(22) Filed: Dec. 12, 2006

(65) Prior Publication Data

US 2007/0131330 A1 Jun. 14, 2007

(30) Foreign Application Priority Data

Dec. 13, 2005 (JP) .............................. 2005-359329

(51) Int. Cl.
*B60C 17/00* (2006.01)
*B60C 17/04* (2006.01)
*B60C 17/06* (2006.01)

(52) U.S. Cl. ...................................... 152/516; 152/520

(58) Field of Classification Search .................. 152/516, 152/517, 520
See application file for complete search history.

(56) References Cited

U.S. PATENT DOCUMENTS 5,309,970 A * 5/1994 Kawabata et al. ........... 152/517

7,255,146 B2 * 8/2007 Kirby ........................ 152/517

FOREIGN PATENT DOCUMENTS

| JP | 8-337101 A | 12/1996 |
| JP | 2002-211216 A | 7/2002 |
| JP | 2002-301911 A | 10/2002 |
| JP | 2006-264492 | * 10/2006 |

* cited by examiner

*Primary Examiner*—Justin Fischer
(74) *Attorney, Agent, or Firm*—Birch, Stewart, Kolasch & Birch, LLP

(57) ABSTRACT

A runflat tire having an improved ride comfort performance without impairing the runflat durability, and comprising a carcass 6 and sidewall-reinforcing rubber layers 9 having a crescent-shaped cross section disposed axially inward of carcass 6 in sidewall portion 3, wherein each sidewall-reinforcing rubber layer 9 comprises at least a radially outermost first rubber portion 9a and a second rubber portion 9b which is contiguous to the first rubber portion 9a and extends toward a bead portion 4, and the second rubber portion 9b has a complex modulus $E^*2$ of at least 1.1 times the complex modulus $E^*1$ of the first rubber portion 9a.

5 Claims, 5 Drawing Sheets

RUNFLAT TIRE

BACKGROUND OF THE INVENTION

The present invention relates to a runflat tire capable of being safely and continuously driven for a relatively long distance in a deflated condition that the tire has lost air pressure due to a puncture, and more particularly to a runflat tire having an improved ride comfort performance in normal running without impairing the durability of tire in runflat mode.

A runflat tire is known as a tire which can be safely driven a certain distance at a relatively high speed in a deflated condition that the tire has lost air pressure due to a puncture or the like. Such a running is hereinafter referred to as "runflat running". A runflat tire of this kind is provided with a sidewall-reinforcing rubber layer having a crescent-shaped cross section in a sidewall portion thereof. When it is deflated, the sidewall-reinforcing rubber layer supports the weight of a vehicle to prevent the tire from collapsing.

However, runflat tires of this kind have the disadvantage of being poor in ride comfort performance in normal running where the tires are inflated by a proper air pressure. In order to solve such a problem, it is conceivable to form the sidewall-reinforcing rubber layer from a soft rubber and/or to decrease the thickness of the sidewall-reinforcing rubber layer, but the runflat durability is decreased thereby.

Accordingly, it is an object of the present invention to provide a runflat tire, the ride comfort performance of which is improved without impairing the durability of the tire in runflat mode.

This and other objects of the present invention will become apparent from the description hereinafter.

SUMMARY OF THE INVENTION

In accordance with the present invention, there is provided a runflat tire comprising a toroidal carcass which extends from a tread portion to each of bead cores in bead portions through sidewall portions, and a pair of sidewall-reinforcing rubber layers which are disposed axially inward of the carcass in the sidewall portions and which have a crescent-shaped cross section, wherein each of the sidewall-reinforcing rubber layers comprises at least a radially outermost first rubber portion and a second rubber portion which is contiguous to the first rubber portion and extends therefrom toward the bead portion, and the second rubber portion has a complex modulus $E^*2$ of at least 1.1 times the complex modulus $E^*1$ of the first rubber portion.

The first rubber portion located on the side closest to the tread portion of the sidewall-reinforcing rubber layer is made of a rubber having a relatively low complex elastic modulus, and serves to ease a vibration or an impact in the tread portion to improve the ride comfort performance. The second rubber portion which is continuous with the first rubber portion and is located on the bead portion side with respect to the first rubber portion is made of a rubber having a complex elastic modulus larger than that of the first rubber portion, and serves to suppress a vertical bending of the tire, thus preventing the runflat durability from lowering.

Preferably, in a meridian section including the rotation axis of a tire in a normal state that the tire is mounted on a standard rim and inflated to a normal internal pressure but is unloaded, the interface between the first rubber portion and the second rubber portion of the sidewall-reinforcing rubber layer lies substantially at right angles to the center line of the thickness of the sidewall-reinforcing rubber layer.

The sidewall-reinforcing rubber layer may be further provided with a third rubber portion which is contiguous to the second rubber portion to substantially locate radially inward of the second rubber portion and which has a complex modulus $E^*3$ larger than the complex modulus $E^*2$ of the second rubber portion, or may be provided with the third rubber portion and additional rubber portions, e.g., a fourth rubber portion which is contiguous to the third rubber portion to substantially locate radially inward of the third rubber portion and which has a complex modulus $E^*4$ larger than the complex modulus $E^*3$ of the third rubber portion.

The term "standard rim" as used herein means a rim defined for every tire in a standardizing system on which the tire is based and, for example, denotes "standard rim" in JATMA, "design rim" in TRA and "measuring rim" in ETRTO.

Also, the term "normal internal pressure" as used herein means an air pressure defined for every tire in a standardizing system and, for example, denotes the maximum air pressure in JATMA, the maximum value recited in the table of "Tire Load Limits at Various Cold Inflation Pressures" in TRA, and the "Inflation Pressure" in ETRTO, provided that in case of tires for passenger cars, the "normal internal pressure" is 180 kPa.

Further, the term "complex modulus" (or "complex elastic modulus") as used herein denotes a value measured with respect to rectangular samples having a size of 4 mm in width, 30 mm in length and 1.5 mm in thickness by a viscoelasticity spectrometer made by Kabushiki Kaisha Iwamoto Seisakusho under the conditions of measuring temperature 70° C., frequency 10 Hz, initial strain 10% and dynamic strain±2%.

DETAILED DESCRIPTION OF THE INVENTION

An embodiment of the present invention will now be explained with reference to the accompanying drawings.

Figure 1:
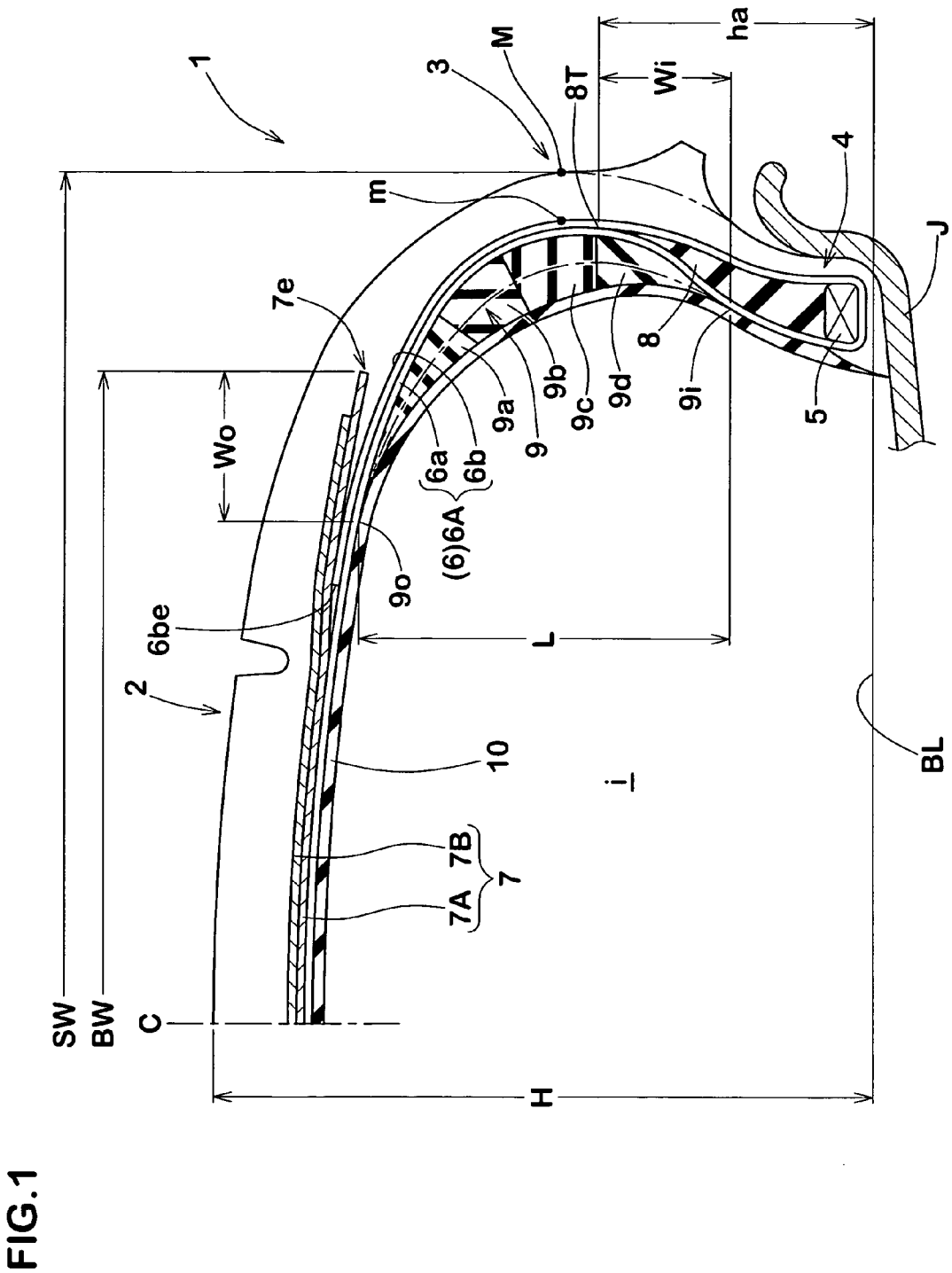
FIG. 1 is a cross sectional view of a runflat tire illustrating an embodiment of the present invention.
Figure 2:
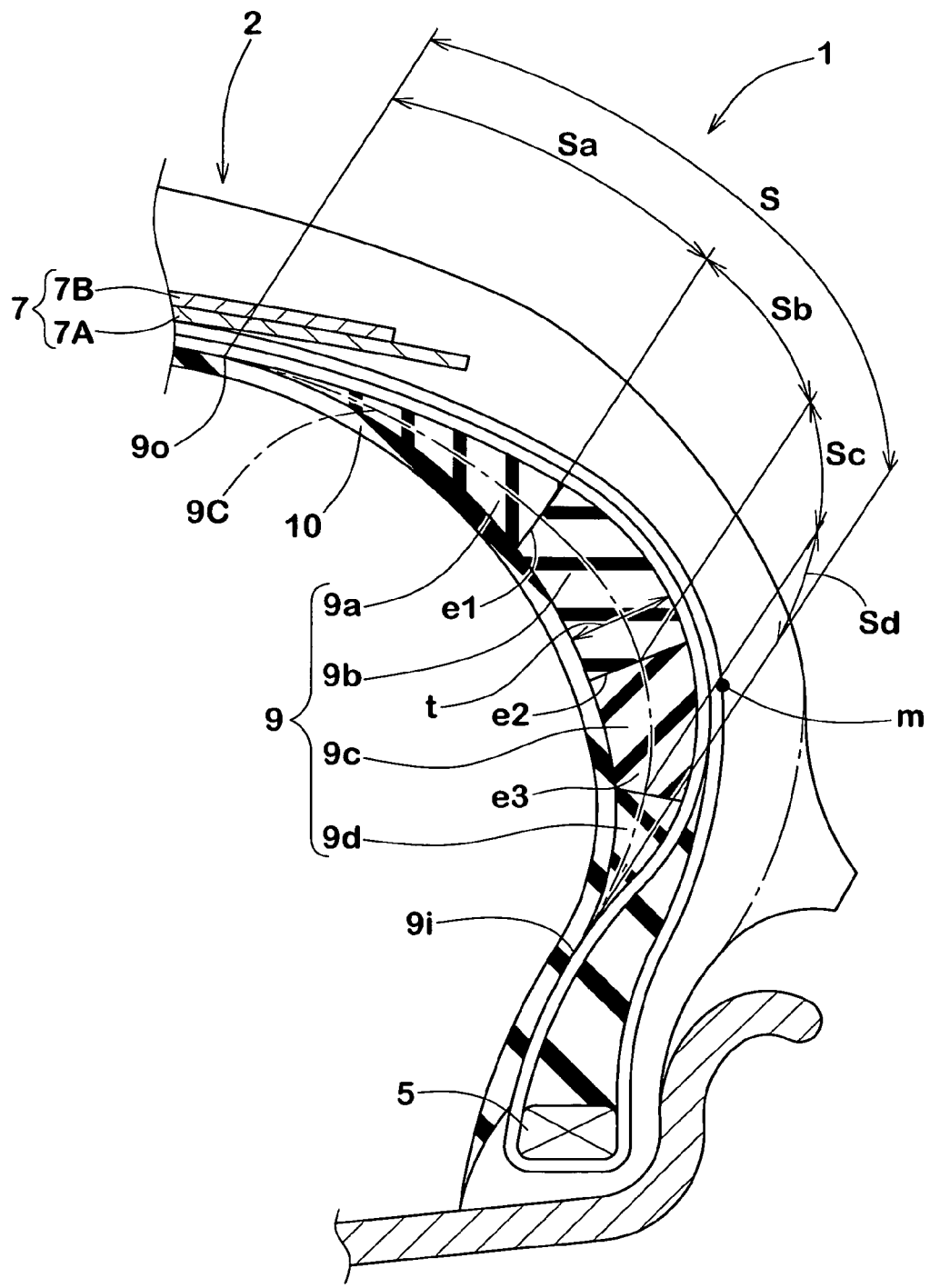
FIG. 2 is a cross sectional view illustrating a part of the tire shown in FIG. 1 in an enlarged form.
Figure 3:
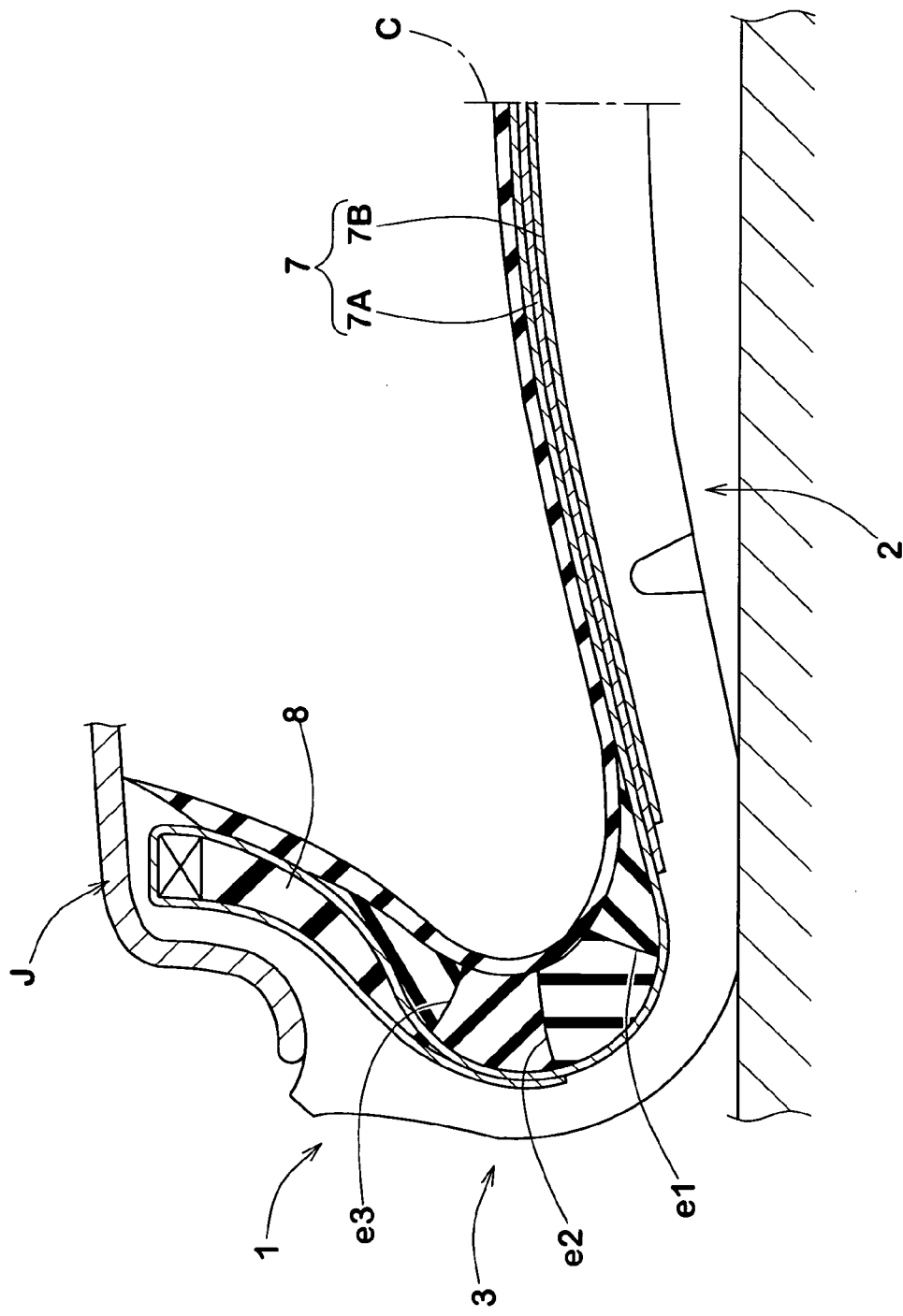
FIG. 3 is a cross sectional view illustrating a deflated state of the tire shown in FIG. 1.

FIG. 1 is a meridian section view illustrating a runflat tire in the normal state according to an embodiment of the present invention. FIG. 2 is an enlarge view of a part of the tire shown in FIG. 1. FIG. 3 is a cross sectional view illustrating the tire in a runflat mode that the internal pressure is zero and the tire is loaded with a normal load. The term "normal load" is a load defined for every tire in a standardizing system and, for example, denotes the maximum load capacity in JATMA, the maximum value recited in the table of "Tire Load Limits at Various Cold Inflation Pressures" in TRA, and the "Load Capacity" in ETRTO.

In FIGS. 1 to 3, runflat tire 1 includes a carcass 6 that extends from a tread portion 2 to each of bead cores 5 in opposing bead portions 4 through sidewall portions 3, a belt layer 7 that is disposed radially outward of the carcass 6 in the tread portion 2, a pair of bead apexes 8 each extending radially outwardly in a tapered manner from a radially outer surface of the bead core, a sidewall-reinforcing rubber layer 9 having an approximately crescent-shaped cross section that is disposed axially inward of the carcass 6 in at least a part of a region of the sidewall portion 3, and an inner liner 10 made of a rubber having a gas barrier property and disposed axially inward of the sidewall-reinforcing rubber layer to cover the entire inner surface of the tire. Numeral J denotes a rim.

The carcass 6 comprises at least one carcass ply 6A (in this embodiment, single carcass ply) in which carcass cords are disposed at an angle of 70 to 90° with respect to the tire equator C and covered with a topping rubber. As a carcass cord is preferred an organic fiber cord such as nylon, polyester, rayon or aromatic polyamide cord. The carcass ply 6A is composed of a toroidal main body portion 6a that extends from one bead core 5 to the opposing bead core 5, passing through the crown region of the tire, and a pair of turnup portions 6b that are continuous with the both ends of the main body portion 6a and are turned up around the bead cores 5 from the axially inside to the axially outside of the tire to thereby anchor the carcass ply.

A bead apex rubber 8 for reinforcing the bead portion is disposed radially outward of each bead core 5 and between main body portion 6a and turnup portion 6b of the carcass ply to radially outwardly extend from the bead core 5 in a tapered manner. Preferably, the bead apex rubber 8 is made of a relatively hard rubber having a shore A hardness of 65 to 95, especially 70 to 90, measured by a durometer type A at 23° C. The section height "ha" of the bead apex rubber 8 (radial distance) from a bead base line BL to the tip 8T (radially outer end) of the bead apex rubber 8 is not particularly limited. However, if the height of the bead apex rubber 8 is too small, the steering stability is easy to be deteriorated, and if the height is too large, the ride comfort performance may be deteriorated. Therefore, from such points of view, it is preferable that the height "ha" of the bead apex rubber 8 is at least 20%, especially at least 25%, of the section height H of the tire, and is at most 50%, especially at most 45%, of the section height H of the tire.

In the embodiment shown in FIG. 1, the carcass ply 6A has a so-called high turnup structure wherein the turnup portion 6b extends radially outwardly beyond the radially outer end 8T of the bead apex rubber 8 and terminates at an axially edge portion of a belt layer 7 in such a manner that the outer end 6be of the turnup portion 6b is sandwiched between the carcass ply main body portion 6a and the belt layer 7. This structure can effectively reinforce the sidewall portion 3 by the use of a single carcass ply. In case of forming the carcass 6 using a plurality of carcass plies, it is preferable that at least one carcass ply has such a high turnup structure.

The belt layer 7 comprises a plurality of belt plies (in this embodiment, two radially inner and outer belt plies 7A and 7B) in each of which belt cords are arranged at an angle, for example, of 10 to 35° with respect to the tire equator C and covered with a topping rubber. The belt plies are stacked so that the belt cords in one ply cross the cords in the other belt ply. The width BW of the belt layer 7 (in this embodiment, the width of the widest belt ply 7A) is preferably from 70 to 95% of the maximum width SW of the tire. By such a structure, the belt layer 7 exhibits a hoop effect over almost the whole region of the tread portion 2 to retain the profile of the tire as explained after.

The maximum tire width SW denotes an axial distance of a tire in the normal state between maximum tire width positions M, M. The maximum tire width position M is determined from the profile shape of a tire in the normal state from which concave and convex parts provided on the sidewall portions 3 such as letters, figures, marks, patterns and rim protector are removed, and is located at substantially the same level as a maximum width position "m" of the carcass 6.

In order to retain air in the cavity "i", of the tire, the inner liner rubber 10 is disposed in a toroidal form on the inner surface of the tire so as to extend approximately between the bead portions 4, 4 and to cover the radially inner surface of the sidewall-reinforcing rubber layer 9. As an inner liner rubber 10 is preferred a material containing a rubber having a gas barrier property, e.g., butyl rubber and/or a halogenated butyl rubber such as chlorobutyl rubber, bromobutyl rubber or a mixture thereof.

The sidewall-reinforcing rubber layer 9 is disposed axially inward of the main body portion 6a of the carcass 6 in the sidewall portion 3. The sidewall-reinforcing rubber layer 9 has a cross section of an approximately crescent-shape such that it has the maximum thickness at its center portion and extends radially from the center portion to both the radially inner end 9i and the radially outer end 9o with gradually decreasing the thickness, respectively.

It is preferable that the inner end 9i of the sidewall-reinforcing rubber layer 9 is located radially inside the radially outer end 8T of the bead apex rubber 8 and radially outside the bead core 5, whereby there is no portion having a low rigidity between the sidewall-reinforcing rubber layer 9 and the bead apex rubber 8 since they are disposed in a partly overlapping manner, so the flexural rigidity in a region extending from the sidewall portion 3 to the bead portion 4 can be enhanced in a good balance. It is preferable that the radial width Wi of the overlapping part of the sidewall-reinforcing rubber layer 9 with the bead apex rubber 8 is from 5 to 50 mm.

The sidewall-reinforcing rubber layer 9 extends to the tread portion 2 and, preferably, it terminates so that the outer end 9o is located axially inside an axially outer end 7e of the belt layer 7, whereby the rigidity in a tire shoulder portion is enhanced. The axial width Wo of an overlapping part of the sidewall-reinforcing rubber layer 9 with the belt layer 7 is preferably from about 5 to about 50 mm.

The radial length L between the inner end 9i and the outer end 9o of the sidewall-reinforcing rubber layer 9 is not particularly limited. However, if the radial length L is too small, the effect of reinforcing the sidewall portion 3 is decreased, and if it is too large, the ride comfort and the mountability on rims of the tires tend to be deteriorated. From such points of view, the radial length L of the sidewall-reinforcing rubber layer 9 is preferably from 35 to 70%, more preferably from about 40 to about 65%, of the section height H of the tire 1.

The maximum thickness "t" of the sidewall-reinforcing rubber layer 9 is suitably selected according to load applied, tire size and the like. In case of tires for passenger cars, the maximum thickness "t" is usually from 5 to 20 mm. If the maximum thickness "t" is too small, the effect of reinforcing the sidewall portion 3 is hard to be obtained, and if it is too large, there are a fear of increase in tire weight and a fear of inviting excessive heat generation. From such points of view, the maximum thickness "t" is preferably at least 5 mm, more preferably at least 8 mm, and is preferably at most 20 mm, more preferably at most 15 mm.

The sidewall-reinforcing rubber layer 9 includes, at least, a radially outermost first rubber portion 9a which is located on the side closest to the tread portion 2 of the sidewall-reinforcing rubber layer, and a second rubber portion 9b which is contiguous to the first rubber portion 9a and extends therefrom toward the bead portion 4.

The first rubber portion 9a extends radially inwardly from the radially outer end 9o which is located radially inward of the belt layer 7 along with the carcass 6. In the embodiment as shown in FIGS. 1 to 3, the first portion 9a has an approximately triangular cross section. It is made of a rubber having the lowest complex modulus E*1 among the sidewall-reinforcing rubber layer 9, whereby it serves to directly absorb a vibration or an impact that the tread portion 2 will receive, inside the tread portion 2 so as to improve the ride comfort performance. Since the first portion 9a absorbs a rubber deformation in runflat running, it also serves to ease a strain so as to enhance the durability.

The complex modulus E*1 of the first rubber portion 9a is not particularly limited. However, it the complex modulus E*1 is too small, sufficient improvement in ride comfort is not achieved, and if it is too large, the runflat durability may be deteriorated. Therefore, it is preferable that the first rubber portion 9a of the sidewall-reinforcing rubber layer 9 has a complex modulus E*1 of at least 1 MPa, especially at least 2 MPa, more especially at least 4 MPa, and a complex modulus E*1 of at most 20 MPa, especially at most 10 MPa.

The length Sa of the first rubber portion 9a measured along the center line 9C in the thickness direction of the sidewall-reinforcing rubber layer 9 is not particularly limited. Since sufficient improvement in ride comfort is not achieved if the length Sa is too small, and since the runflat durability may be deteriorated if the length Sa is too large, it is preferable that the length Sa of the first rubber portion 9a is at least 25%, especially at least 30%, of the full length S measured along the center line 9C in the thickness direction of the sidewall-reinforcing rubber layer 9, and is at most 50%, especially at most 45%, of the full length S.

The second rubber portion 9b is preferably made of a rubber having a complex modulus E*2 of at least 1.1 times, especially at least 1.2 times, more especially at least 1.4 times, the complex modulus E*1 of the first rubber portion 9a. By disposing such a second rubber portion 9b having a larger complex modulus on the bead portion side with respect to the first rubber portion 9a, a vertical bending of the tire in runflat mode is suppressed to prevent occurrence of heat generation and damage of the tire for a long time. If the complex modulus E*2 of the second rubber portion 9b is too large, a large difference in rigidity generates at the interface e1 between the first and second rubber portions 9a and 9b, so a stress concentrates there and damages are easy to occur. Therefore, it is preferable that the complex modulus E*2 of the second rubber portion 9b is at most 10 times, especially at most 8 times, the complex modulus E*1 of the first rubber portion 9a.

The second rubber portion 9b may extends up to the radially inner end 9i of the sidewall-reinforcing rubber layer 9. In that case, the sidewall-reinforcing rubber layer 9 is formed by two kinds of rubbers having a different complex modulus. Alternatively, in order to further improve the runflat durability, the sidewall-reinforcing rubber layer 9 may further comprises at least one additional rubber portion. It is preferable to form the sidewall-reinforcing rubber layer 9 from at least three kinds of rubbers, especially from four kinds of rubbers, so that the complex modulus of the sidewall-reinforcing rubber layer 9 increases toward the bead portion side, whereby strain generated in the sidewall portion 3 becomes more uniform in runflat mode to result in improvement of runflat durability.

The sidewall-reinforcing rubber layer in this embodiment as shown in FIGS. 1 and 2 is made of four kinds of rubbers having a different complex modulus from each other. That is to say, besides the first and second rubber portions 9a and 9b, it further includes a third rubber portion 9c which is continuous with the bead portion side of the second rubber portion 9b and extends therefrom toward the bead portion 4, and a fourth rubber portion 9d which is continuous with the third rubber portion 9c and extends to the radially inner end 9i of the sidewall-reinforcing rubber layer 9.

The third rubber portion 9c is made of a rubber having a complex modulus E*3 larger than the complex modulus E*2 of the second rubber portion 9b. The third rubber portion 9c is located in a region including the level of the maximum width position "m" of carcass 6 and extends radially upwardly and downwardly from that level. In effectively suppressing the vertical bending of a tire in runflat mode, it is effective to reinforce a vicinity of the maximum width position "m" of carcass 6. From such a point of view, it is preferable that the complex modulus E*3 of the third rubber portion 9c is at least 1.05 times, especially at least 1.1 times, more especially at least 1.2 times, the complex modulus E*2 of the second rubber portion 9b. On the other hand, if the complex modulus E*3 of the third rubber portion 9c is too large, the longitudinal spring of a tire in normal running becomes very large to deteriorate the ride comfort performance. Therefore, it is preferable that the complex modulus E*3 of the third rubber portion 9c is at most 10 times, especially at most 8 times, more especially at most 5 times, the complex modulus E*2 of the second rubber portion 9b.

The fourth rubber portion 9d is made of a rubber having a complex modulus E*4 larger than the complex modulus E*3 of the third rubber portion 9c. Similarly to the third rubber portion 9c, it is preferable for sufficiently suppressing the vertical bending of a tire in runflat mode that the fourth rubber portion 9d has a complex modulus E*4 of at least 1.05 times, especially at least 1.1 times, more especially at least 1.2 times, the complex modulus E*3 of the third rubber portion 9c. On the other hand, if the complex modulus E*4 of the fourth rubber portion 9d is too large, the longitudinal spring of a tire in normal running becomes very large to deteriorate the ride comfort performance. Therefore, it is also preferable that the complex modulus E*4 of the fourth rubber portion 9d is at most 10 times, especially at most 8 times, more especially at most 5 times, the complex modulus E*3 of the third rubber portion 9c.

The lengths Sb, Sc and Sd of the second, third and fourth rubber portions 9b, 9c and 9d measured along the center line 9C in the thickness direction of the sidewall-reinforcing rubber layer 9 are not particularly limited, but it is preferable that they have a relationship of Sb>Sc>Sd. Since the rubber portions 9b, 9c and 9d in this embodiment have complex moduluses E*2, E*3 and E*4 satisfying a relationship of E*2<E*3<E*4, it is preferable in preventing deterioration of ride comfort that the larger the complex modulus of a rubber portion, the smaller the length of the rubber portion. Thus, both the ride comfort in normal running and the runflat durability are effectively improved.

As apparent from FIGS. 1 and 2, in the normal state, the interface e1 between the first rubber portion 9a and the second rubber portion 9b of the sidewall-reinforcing rubber layer 9 lies substantially at right angles to the center line 9C in the thickness direction of the sidewall-reinforcing rubber layer 9. Similarly, the interface e2 between the second rubber portion 9b and the third rubber portion 9c and the interface e3 between the third rubber portion 9c and the fourth rubber portion 9d also lie substantially at right angles to the center line 9C in the thickness direction of the sidewall-reinforcing rubber layer 9. In particular, the interfaces e2 and e3 are formed so that they extend at an angle smaller than 45° with respect to the tire axial direction in a runflat mode shown in FIG. 3, whereby the interlaminar separation at the interfaces e2 and e3 is effectively prevented since a longitudinal load acts on the interfaces e2 and e3 at an angle close to the vertical A profile line of the outer surface of a runflat tire according to a preferable embodiment of the present invention will be explained below.

Figure 4:
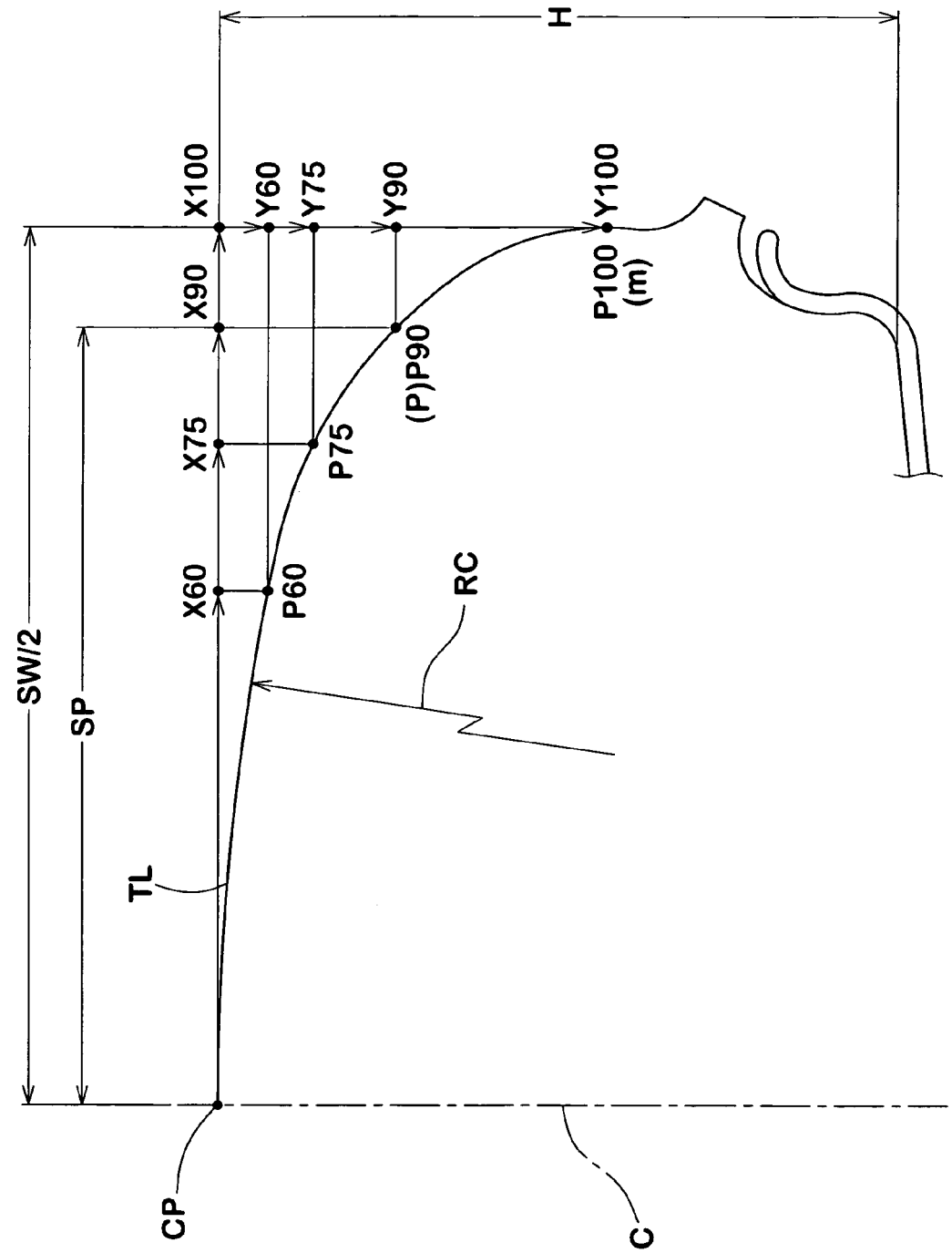
FIG. 4 is a diagram showing a profile of the outer surface of a tire.

FIG. 4 shows a profile TL of the outer surface of the tire in the normal state, in which the profile TL is drawn with filling up grooves disposed in the tread portion. In the normal state, when "CP" is an intersecting point of the tire equator plane C and the tire outer surface and "P" is a point on the tire outer surface which is apart from the intersecting point CP by a distance SP of 45% of the maximum section width SW of the tire, it is preferable that the tire has such a profile that the radius RC of curvature of the tire outer surface is set to gradually decrease from the intersecting point CP to the point P, and that it satisfies the following equations:

$$0.05 < Y60/H < 0.1$$

$$0.1 < Y75/H < 0.2$$

$$0.2 < Y90/H < 0.4$$

$$0.4 < Y100/H < 0.7$$

wherein Y60, Y75, Y90 and Y100 each denotes a radial distance between the intersecting point CP and each of points P60, P75, P90 and P100 on the tire outer surface which are apart from the tire equator plane C by axial distances X60, X75, X90 and X100 of 60%, 75%, 90% and 100% of the half width (SW/2) of the tire maximum section width SW, respectively, and H denotes a section height (radial distance) of the tire from the bead base line BL to the intersecting point CP.

Figure 5:
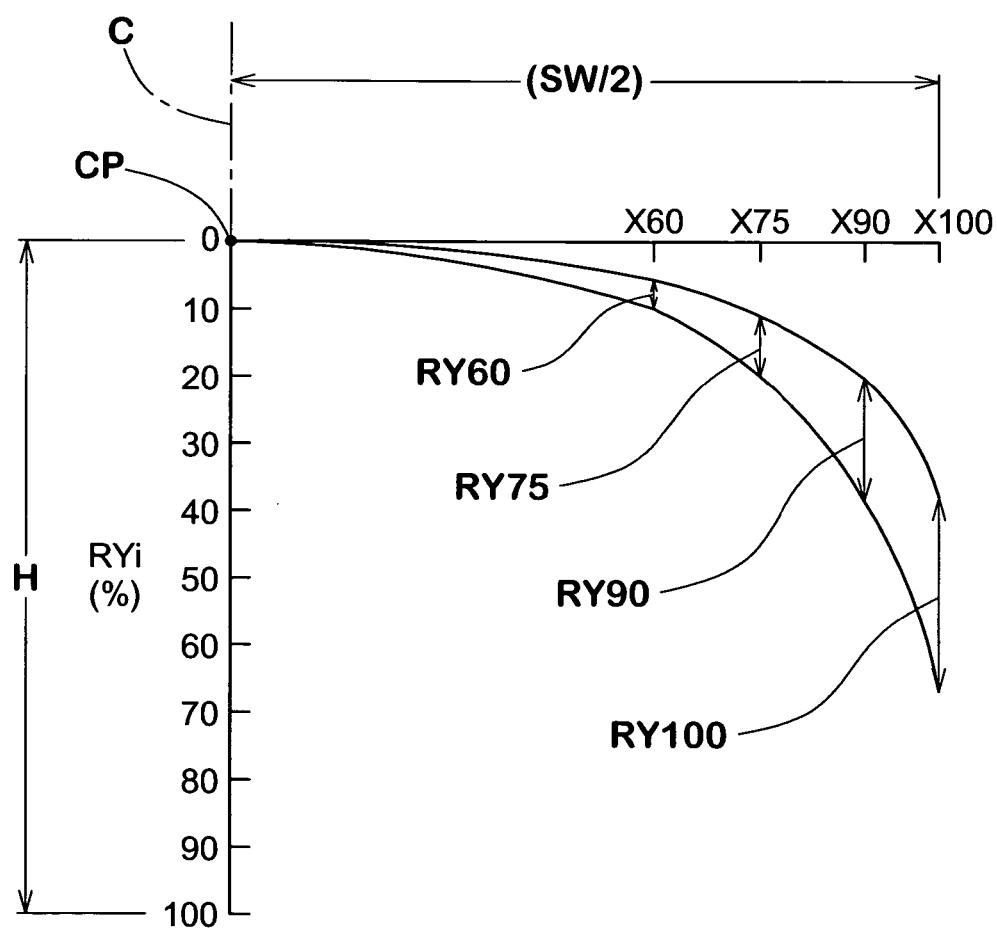
FIG. 5 is a graph showing a relationship between an axial distance from the tire equator plane of a point on a tread profile line (outer surface of tread) and a radial distance of the point from the tire equator point.

Ranges satisfying the above equations are shown in FIG. 5 wherein RY60=Y60/H, RY75=Y75/H, RY90=Y90/H and RY100=Y100/H. As apparent from FIGS. 4 and 5, the tire outer surface satisfying the above equations has a very round profile. Therefore, tires having such a profile show a footprint such that the ground contact width is small and the ground contact length is large. This is useful for enhancing the noise performance and the aquaplaning performance.

Such a profile also has the feature that the region of the sidewall portion 3 is short. Therefore, application of such a profile to the runflat tire 1 of the present invention is preferred particularly in that besides being able to provide tires essentially hard to bend, the volume of the sidewall-reinforcing rubber layer 9 can be decreased and, therefore, weight reduction and improvement in ride comfort of runflat tires can be achieved. The decrease in radius of curvature RC may be stepwise, but preferably the radius of curvature RC is decreased continuously as in the embodiment shown in FIG. 4.

The runflat tires of the present invention are particularly suitable for use in passenger cars. While a preferable embodiment of the present invention has been described with reference to the drawings, it goes without saying that the present invention is not limited to only such an embodiment and various changes and modifications may be made. The present invention is more specifically described and explained by means of the following examples. It is to be understood that the present invention is not limited to these examples.

EXAMPLES

Runflat tires (size: 245/40R18) having a base structure shown in FIG. 1 were manufactured based on the specifications shown in Table 1 wherein the profile of the tire outer surface and the constitution of the sidewall-reinforcing rubber layer were varied. Common specifications of the sidewall-reinforcing rubber layer are as follows:

Axial length Wo of an overlapping part with belt layer: 15 mm

Radial length Wi of an overlapping part with bead apex rubber: 10 mm

Radial length L of sidewall-reinforcing rubber layer: 30 mm

Full length S along the center line of thickness: 35 mm

Maximum thickness "t": 7 mm

The performances of the runflat tires were tested by the following methods. The results are shown in Table 1.

<Ride Comfort Performance>

Tires were mounted on each rim J (size: 18×8.5 JJ), inflated to an inner pressure of 230 kPa and attached to four wheels of a Japanese 3,000 cc FR car. The car was run on a dry asphalt road having steps, a Belgian road (stone road), a bitumen road (gravel road) and the like, and organoleptic test was made with respect to stiffish feeling, thrusting up feeling and damping. The results are shown as an index based on the result of Comparative Example 1 regarded as 100. The larger the value, the better the ride comfort performance.

<Runflat Durability>

A tire was mounted on a rim J (size: 18×8.5 JJ), inflated to an inner pressure of 230 kPa and allowed to stand at 38° C. for 34 hours. A valve core was then removed from the rim to make the tire cavity communicate with the atmosphere. The tire was then run on a drum having a radius of 1.7 m of a drum tester in the deflated state at a speed of 80 km/hour under a vertical load of 4.14 kN. The running distance up to breaking of the tire was measured. The results are shown as an index based on the result of Comparative Example 1 regarded as 100. The larger the value, the better the durability.

<Weight of Tire>

The weight of a tire (weight per a tire) was measured. The results are shown as an index based on the result of Comparative Example 1 regarded as 100. The smaller the value, the lighter the tire.

It is observed in Table 1 that the tires of the Examples according to the present invention are improved in ride comfort performance without impairing the runflat durability as compared with the tires of the Comparative Examples.

TABLE 1

|  | Com. Ex. 1 | Com. Ex. 2 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| Sidewall-reinforcing layer |  |  |  |  |  |  |  |  |  |  |  |  |
| Number of rubber kinds | 1 | 1 | 2 | 2 | 2 | 2 | 2 | 2 | 3 | 4 | 4 | 4 |
| E*1 of 1st portion (MPa) | 11 | 4 | 9 | 7 | 4 | 9 | 7 | 4 | 7 | 7 | 4 | 4 |
| E*2 of 2nd portion (MPa) | — | — | 11 | 11 | 11 | 11 | 11 | 11 | 11 | 11 | 11 | 11 |
| E*3 of 3rd portion (MPa) | — | — | — | — | — | — | — | — | 13 | 13 | 12 | 12 |
| E*4 of 4th portion (MPa) | — | — | — | — | — | — | — | — | — | 15 | 13 | 13 |

TABLE 1-continued

|  | Com. Ex. 1 | Com. Ex. 2 | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|---|
| E*2/E*1 ratio | — | — | 1.22 | 1.57 | 2.75 | 1.22 | 1.57 | 2.75 | 1.57 | 1.57 | 2/75 | 2.75 |
| E*3/E*2 ratio | — | — | — | — | — | — | — | — | 1.18 | 1.18 | 1.09 | 1.09 |
| E*4/E*3 ratio | — | — | — | — | — | — | — | — | — | 1.15 | 1.08 | 1.08 |
| Sa/S ratio (%) | 100 | 100 | 40 | 40 | 40 | 40 | 40 | 40 | 40 | 40 | 40 | 40 |
| Sb/S ratio (%) | 0 | 0 | 60 | 60 | 60 | 60 | 60 | 60 | 30 | 20 | 20 | 25 |
| Sc/S ratio (%) | 0 | 0 | 0 | 0 | 0 | 0 | 0 | 0 | 30 | 20 | 20 | 20 |
| Sd/S ratio (%) | 0 | 0 | 0 | 0 | 0 | 0 | 0 | 0 | 0 | 20 | 20 | 15 |
| Profile of tire outer surface |  |  |  |  |  |  |  |  |  |  |  |  |
| RY60 |  |  |  | 0.06 |  |  |  |  |  | 0.09 |  |  |
| RY75 |  |  |  | 0.08 |  |  |  |  |  | 0.14 |  |  |
| RY90 |  |  |  | 0.19 |  |  |  |  |  | 0.37 |  |  |
| RY100 |  |  |  | 0.57 |  |  |  |  |  | 0.57 |  |  |
| Ride comfort performance | 100 | 120 | 103 | 105 | 110 | 111 | 115 | 119 | 120 | 120 | 119 | 120 |
| Runflat durability (index) | 100 | 80 | 103 | 107 | 112 | 110 | 117 | 115 | 117 | 120 | 118 | 122 |
| Weight of tire (index) | 100 | 100 | 100 | 100 | 100 | 93 | 93 | 93 | 93 | 93 | 93 | 93 |

What is claimed is:

1. A runflat tire comprising
a toroidal carcass which extends from a tread portion to each of bead cores in bead portions through sidewall portions, and
a pair of sidewall-reinforcing rubber layers which are disposed axially inward of the carcass in the sidewall portions and which have an approximately crescent-shaped cross section, wherein
each of the sidewall-reinforcing rubber layers comprises
a radially outermost first rubber portion,
a second rubber portion which is contiguous to the first rubber portion and extends therefrom toward the bead portion,
a third rubber portion which is contiguous to the second rubber portion to substantially locate radially inward of the second rubber portion, and
a fourth rubber portion which is contiguous to the third rubber portion to substantially locate radially inward of the third rubber portion,
the second rubber portion has a complex modulus E*2 of at least 1.1 times the complex modulus E*1 of the first rubber portion,
the third rubber portion has a complex modulus E*3 larger than the complex modulus E*2 of the second rubber portion, and
the fourth rubber portion has a complex modulus E*4 larger than the complex modulus E*3 of the third rubber portion,
in a meridian section of the tire including the rotational axis of the tire in a normal state that the tire is mounted on a standard rim and inflated to a normal internal pressure but is unloaded,
the interface between the first rubber portion and second rubber portion,
the interface between the second rubber portion and third rubber portion and
the interface between the third rubber portion and fourth rubber portion
lie substantially at right angles to the center line of the thickness of the sidewall-reinforcing rubber layer,
when measured along the center line of the thickness of the sidewall-reinforcing rubber layer,
the length Sa of the first rubber portion 9a is at least 25% but at most 50% of the full length S of said center line, and
the length Sb of the second rubber portion is larger than the length Sc of the third rubber portion which is larger than the length Sd of the fourth rubber portion.

2. The runflat tire of claim 1, wherein
the complex modulus E*2 of the second rubber portion is at least 1.4 times the complex modulus E*1 of the first rubber portion.

3. The runflat tire of claim 1, wherein in the meridian section of the tire, the tire has a profile such that the radius of curvature of the tire outer surface gradually decreases from an intersecting point CP of the tire equator plane C and the tire outer surface to a point P on the tire outer surface which is apart from the intersecting point CP by a distance SP of 45% of the maximum section width SW of the tire, and the following equations are satisfied:

$$0.05 < Y60/H \leq 0.1$$

$$0.1 < Y75/H \leq 0.2$$

$$0.2 < Y90/H \leq 0.4$$

$$0.4 < Y100/H \leq 0.7$$

wherein Y60, Y75, Y90 and Y100 denote radial distances between the intersecting point CP and points P60, P75, P90 and P100 on the tire outer surface, respectively, which are apart from the tire equator plane C by axial distances of 60%, 75%, 90% and 100% of the half width (SW/2) of the tire maximum section width SW, respectively, and H denotes a section height of the tire.

4. The runflat tire of claim 1, wherein
the third rubber portion is located near a maximum width position (in) of the carcass.

5. A runflat tire comprising:
a toroidal carcass which extends from a tread portion to each of bead cores in bead portions through sidewall portions, and
a pair of sidewall-reinforcing rubber layers which are disposed axially inward of the carcass in the sidewall portions and which have an approximately crescent-shaped cross section, wherein
each of the sidewall-reinforcing rubber layers comprises
a radially outermost first rubber portion,
a second rubber portion which is contiguous to the first rubber portion and extends therefrom toward the bead portion, a third rubber portion which is contiguous to the second rubber portion to substantially locate radially inward of the second rubber portion, and a fourth rubber portion which is contiguous to the third rubber portion to substantially locate radially inward of the third rubber portion, the second rubber portion has a complex modulus $E^*2$ of at least 1.1 times the complex modulus $E^*1$ of the first rubber portion, the third rubber portion has a complex modulus $E^*3$ larger than the complex modulus $E^*2$ of the second rubber portion, and the fourth rubber portion has a complex modulus $E^*4$ larger than the complex modulus $E^*3$ of the third rubber portion, in a meridian section of the tire including the rotational axis of the tire in a normal state that the tire is mounted on a standard rim and inflated to a normal internal pressure but is unloaded, the entirety of the interface (e1) between the first rubber portion and second rubber portion is located radially outside the interface (e2) between the second rubber portion and third rubber portion, and the entirety of the interface (e2) is located radially outside the interface (e3) between the third rubber portion and fourth rubber portion and also radially outside a maximum width position (m) of the carcass, and further the entirety of the interface (e3) is located radially inside the maximum width position (m) of the carcass.

* * * * *